(12) United States Patent
Diaz Sendra

(10) Patent No.: US 11,558,854 B2
(45) Date of Patent: Jan. 17, 2023

(54) CELLULAR TELECOMMUNICATIONS NETWORK

(71) Applicant: British Telecommunications Public Limited Company, London (GB)

(72) Inventor: Salvador Diaz Sendra, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/630,296

(22) PCT Filed: Jun. 18, 2018

(86) PCT No.: PCT/EP2018/066116
§ 371 (c)(1),
(2) Date: Jan. 10, 2020

(87) PCT Pub. No.: WO2019/015900
PCT Pub. Date: Jan. 24, 2019

(65) Prior Publication Data
US 2020/0169997 A1 May 28, 2020

(30) Foreign Application Priority Data
Jul. 18, 2017 (EP) .................................... 17181876

(51) Int. Cl.
*H04W 72/04* (2009.01)
*H04W 84/04* (2009.01)
(Continued)

(52) U.S. Cl.
CPC ....... *H04W 72/0406* (2013.01); *H04W 24/10* (2013.01); *H04W 36/08* (2013.01);
(Continued)

(58) Field of Classification Search
None
See application file for complete search history.

(56) References Cited

U.S. PATENT DOCUMENTS 8,903,402 B2 12/2014 Guo et al.
9,215,629 B2 12/2015 Hapsari et al.
(Continued)

FOREIGN PATENT DOCUMENTS

CN 105611554 A 5/2016
EP 2154917 A1 2/2010
(Continued)

OTHER PUBLICATIONS

3GPP 36.420 v8.0.0 (Dec. 2007), "X2 General Aspects and Principals," Technical Specification, 3rd Generation Partnership Project, http://www.qtc.jp/3GPP/Specs/36420-800.pdf, (Release 8), Dec. 2007, 11 pages.
(Continued)

*Primary Examiner* — Saba Tsegaye
(74) *Attorney, Agent, or Firm* — Patterson Thuente, P.A.

(57) ABSTRACT

The present disclosure provides a method of sending an inter-base station message between a first and second base station in a cellular telecommunications network, wherein the inter-base station message is transmitted via a relay component, the method including the relay component receiving a first inter-base station message from a first base station, wherein the first inter-base station message includes: a first address portion identifying a second and third base station, and a first content portion; the relay component transmitting a second inter-base station message to the second base station, the second inter-base station message including: a second address portion identifying the second base station, and a second content portion; and the relay component transmitting a third inter-base station message to the third base station, the third inter-base station message including: a third address portion identifying the third base station, and a third content portion, wherein the second and third content portions include the first content portion.

5 Claims, 5 Drawing Sheets

(51) Int. Cl.
  *H04W 36/08* (2009.01)
  *H04W 24/10* (2009.01)
  *H04W 88/16* (2009.01)
  *H04W 88/08* (2009.01)
  *H04W 92/04* (2009.01)
  *H04W 92/20* (2009.01)

(52) U.S. Cl.
  CPC ......... *H04W 84/045* (2013.01); *H04W 88/08* (2013.01); *H04W 88/16* (2013.01); *H04W 92/045* (2013.01); *H04W 92/20* (2013.01)

(56) References Cited

U.S. PATENT DOCUMENTS

| | | |
|---|---|---|
| 9,301,105 B2 | 3/2016 | Kim et al. |
| 9,392,420 B2 | 7/2016 | Fodor et al. |
| 9,439,137 B2 | 9/2016 | Kim et al. |
| 10,405,280 B2 | 9/2019 | Mackenzie et al. |
| 2009/0219888 A1 | 9/2009 | Chen et al. |
| 2010/0120447 A1 | 5/2010 | Anderson et al. |
| 2010/0157911 A1 | 6/2010 | Hegde et al. |
| 2010/0178912 A1 | 7/2010 | Gunnarsson et al. |
| 2011/0190027 A1 | 8/2011 | Michel et al. |
| 2011/0274030 A1 | 11/2011 | Wang et al. |
| 2012/0002537 A1 | 1/2012 | Bao et al. |
| 2012/0026865 A1 | 2/2012 | Fan et al. |
| 2012/0157095 A1 | 6/2012 | Fodor et al. |
| 2012/0236828 A1 | 9/2012 | Hapsari et al. |
| 2012/0257495 A1 | 10/2012 | Schwarz et al. |
| 2012/0264418 A1 | 10/2012 | Lee et al. |
| 2012/0275315 A1 | 11/2012 | Schlangen et al. |
| 2013/0005340 A1 | 1/2013 | Drazynski et al. |
| 2013/0035033 A1 | 2/2013 | Sanneck et al. |
| 2013/0039185 A1* | 2/2013 | Teyeb .................. H04W 28/06 370/235 |
| 2013/0084873 A1 | 4/2013 | Sharony et al. |
| 2013/0150044 A1 | 6/2013 | Zhang et al. |
| 2013/0170435 A1 | 7/2013 | Dinan |
| 2013/0242720 A1 | 9/2013 | Chou |
| 2013/0260768 A1 | 10/2013 | Guo et al. |
| 2014/0018057 A1 | 1/2014 | Yu et al. |
| 2014/0038593 A1 | 2/2014 | Kim et al. |
| 2014/0050135 A1 | 2/2014 | Zhang et al. |
| 2014/0071891 A1 | 3/2014 | Zhou et al. |
| 2014/0071943 A1 | 3/2014 | Lee et al. |
| 2014/0092765 A1 | 4/2014 | Agarwal et al. |
| 2014/0126562 A1 | 5/2014 | Gunnarsson et al. |
| 2014/0187236 A1 | 7/2014 | Chiang et al. |
| 2014/0269547 A1 | 9/2014 | Valliappan et al. |
| 2014/0286218 A1 | 9/2014 | Park et al. |
| 2014/0321447 A1 | 10/2014 | Ozturk |
| 2014/0364114 A1 | 12/2014 | Zhao |
| 2015/0063136 A1 | 3/2015 | Shen et al. |
| 2015/0092552 A1 | 4/2015 | Bajj et al. |
| 2015/0131524 A1 | 5/2015 | Cavalcante et al. |
| 2015/0271714 A1 | 9/2015 | Shetigar et al. |
| 2015/0312769 A1 | 10/2015 | Shindo |
| 2015/0358940 A1 | 12/2015 | Zhang et al. |
| 2016/0057699 A1 | 2/2016 | Jang |
| 2016/0088493 A1 | 3/2016 | Byun et al. |
| 2016/0150420 A1 | 5/2016 | Byun et al. |
| 2016/0192177 A1 | 6/2016 | Kim et al. |
| 2016/0255529 A1 | 9/2016 | Zhang et al. |
| 2017/0041098 A1* | 2/2017 | Saghir .................. H04J 11/0053 |
| 2017/0055186 A1 | 2/2017 | Donepudi et al. |
| 2017/0086181 A1 | 3/2017 | Briggs |
| 2017/0303188 A1 | 10/2017 | Fitch et al. |
| 2017/0318526 A1 | 11/2017 | Wang et al. |
| 2018/0049098 A1* | 2/2018 | Ueda .................... H04W 40/22 |
| 2018/0054840 A1 | 2/2018 | Fitch et al. |
| 2018/0146475 A1* | 5/2018 | Mitsui .................. H04W 40/12 |
| 2018/0262922 A1 | 9/2018 | Mackenzie et al. |
| 2018/0376327 A1* | 12/2018 | Sivavakeesar .......... H04W 8/26 |
| 2019/0098582 A1 | 3/2019 | Mackenzie |

FOREIGN PATENT DOCUMENTS

| | | |
|---|---|---|
| EP | 2271142 A1 | 1/2011 |
| EP | 2375807 | 10/2011 |
| EP | 2533571 | 12/2012 |
| EP | 2545661 A1 | 1/2013 |
| EP | 2663131 A1 | 11/2013 |
| EP | 2814279 A1 | 12/2014 |
| EP | 2916584 A1 | 9/2015 |
| EP | 2928225 A1 | 10/2015 |
| EP | 2975886 A1 | 1/2016 |
| EP | 3063977 A1 | 9/2016 |
| EP | 3065438 A1 | 9/2016 |
| WO | WO-2009022976 A1 | 2/2009 |
| WO | WO-2010024743 A1 | 3/2010 |
| WO | WO-2011028158 A1 | 3/2011 |
| WO | WO-2011056023 A2 | 5/2011 |
| WO | WO-2012138125 A2 | 10/2012 |
| WO | WO-2012148442 A1 | 11/2012 |
| WO | WO-2013071813 A1 | 5/2013 |
| WO | WO-2013120274 A1 | 8/2013 |
| WO | WO-2013142361 A1 | 9/2013 |
| WO | WO20130167335 | 11/2013 |
| WO | WO-2014161896 A1 | 10/2014 |
| WO | WO2015006047 | 1/2015 |
| WO | WO-2015019317 A1 | 2/2015 |
| WO | WO-2015034775 A1 | 3/2015 |
| WO | WO-2015062060 A1 | 5/2015 |
| WO | WO2015134985 | 9/2015 |
| WO | WO-2016079016 A1 | 5/2016 |
| WO | WO-2016146328 A1 | 9/2016 |
| WO | WO2016151653 | 9/2016 |
| WO | WO2016185946 | 11/2016 |
| WO | WO-2017148752 A1 | 9/2017 |
| WO | WO-2018059858 A1 | 4/2018 |
| WO | WO-2018059859 A1 | 4/2018 |
| WO | WO-2018059860 A1 | 4/2018 |
| WO | WO-2019015900 A1 | 1/2019 |

OTHER PUBLICATIONS

3GPP TR 24.826 V11.0.0 (Jun. 2011), "3rd Generation Partnership Project, Technical Specification Group Core Network and Terminals; Study on impacts on signalling between User Equipment (UE) and core network from energy saving, (Release 11)," 650 Route des Luciales—Sophia Antipolis Valbonne—France, 33 pages.

3GPP TR 36.927 V15.0.0 (Jul. 2018), "3rd Generation Partnership Project, Technical Specification Group Radio Access Network; Evolved Universal Terrestrial Radio Access (E-UTRA), Potential solution for energy saving for E-UTRAN (Release 15)," 650 Route des Luciales—Sophia Antipolis Valbonne—France, 22 pages.

3GPP TS 32.551 V15.0.0 (Jun. 2018), "3rd Generation Partnership Project, Technical Specification Group Services and System Aspects, Concepts and requirements; Telecommunication management, Energy Saving Management (ESM)," (Release 15), 650 Route des Luciales—Sophia Antipolis Val bonne—France, 26 pages.

3GPP TS 36.300 V11 6.0 (Jun. 2013), "3rd Generation Partnership Project; Technical Specification Group Radio Access Network; Overall description, Evolved Universal Terrestrial Radio Access (E-UTRA) and Evolved Universal Terrestrial Radio Access Network (EUTRAN), Stage 2" (Release II), 650 Route des Luciales—Sophia Antipolis Valbonne—France, 209 pages.

3GPP TS 36.300 V13.3.0 (Mar. 2016), "3rd Generation Partnership Project, Technical Specification Group Radio Access Network, Overall description, Stage 2 Evolved Universal Terrestrial Radio Access (E-UTRA) and Evolved Universal Terrestrial Radio Access Network (E-UTRAN)," (Release 13), 650 Route des Luciales—Sophia Antipolis Valbonne—France, 295 pages.

3rd Generation Partnership Project, Technical Specification Group Radio Access Network, Evolved Universal Terrestrial Radio Access (E-UTRA), Radio Frequency (RF) system scenarios (Release 9) 3GPP TR 36.942 V9.3.0, Jun. 2012, 83 pages.

3rd Generation Partnership Project, Technical Specification Group Services and System Aspects, Telecommunication Management, "Study On Management Of Evolved Universal Terrestrial Radio

(56) References Cited

OTHER PUBLICATIONS

Access Network (E-UTRAN) And Evolved Packet Core (EPC)," Release 8 3GPP TR 32.816 V8.0.0, Technical Report, Valbonne—France, Dec. 2008, 38 pages.
Carlson et al., "Scheduling To Minimize Interaction Cost," The Johns Hopkins University, Baltimore, Maryland, Jun. 2, 1965, 8 pages.
Codan Radio, "RF Link Controlled Base Station," Codan Radio Communications, retrieved from https://www.codanradio.com/product/rf-link-controlled-base/, Accessed on Aug. 8, 2017, 2 pages.
Combined Search and Examination Report under Section 17 and 18(3) for Application No. GB1616539.1, dated Mar. 2, 2017, 6 pages.
Combined Search and Examination Report under Section 17 and 18(3) for GB Application No. 1616530.0, dated Feb. 23, 2017, 6 pages.
Combined Search and Examination Report under Section 17 and 18(3) for GB Application No. 1713816.5, dated Sep. 20, 2017, 5 pages.
Combined Search and Examination Report under sections 17 & 18(3) for Great Britain Application No. 1616534.2, dated Mar. 1, 2017, 8 pages.
Combined Search and Examination Report under sections 17 & 18(3) for Great Britain Application No. 1713815.7, dated Sep. 21, 2017, 5 pages.
ETSI TR 136 927 V13.0.0 (Jan. 2016), "Evolved Universal Terrestrial Radio Access (E-UTRA); Potential Solutions for Energy Saving for E-UTRAN," Technical Report LTE, 3GPP TR 36.927 version 13.0.0 Release 13, 650 Route des Luciales—Sophia Antipolis Valbonne—France, 26 pages.
ETSI TS 132 551 V13.0.0 (Feb. 2016), "Universal Mobile Telecommunications System (UMTS); LTE, Telecommunication management Energy Saving Management (ESM); Concepts and requirement," Technical Specification, Release 13, 650 Route des Luciales—Sophia Antipolis Valbonne—France, 28 pages.
European Search Report for Application No. 19194981.7, dated Nov. 27, 2019, 8 pages.
European Search Report for EP Application No. 16158665.6 dated Sep. 13, 2016, 6 pages.
European Search Report for EP Application No. 16160809.6 dated Sep. 26, 2016, 14 pages.
European Search Report for EP Application No. 16191517.8, dated Mar. 27, 2017, 8 pages.
European Search Report for EP Application No. 16191519.4, dated Mar. 31, 2017, 8 pages.
European Search Report for EP Application No. 16191524.4, dated Apr. 7, 2017, 10 pages.
European Search Report for EP Application No. 17180358.8, dated Jan. 31, 2018, 5 pages.
Examination Report under section 18(3) for GB Application No. 1713816.5, dated Oct. 10, 2017, 3 pages.
Examination Report under section 18(3) for GB Application No. 1713816.5, dated Nov. 15, 2018, 3 pages.
Examination Report under section 18(3) for Great Britain Application No. 1713815.7, dated Nov. 15, 2018, 3 pages.
Extended European Search Report for Application No. 15187067.2, dated Mar. 18, 2016, 8 pages.
Extended European Search Report for Application No. EP14194204.5, dated Jul. 23, 2015, 7 pages.
Extended European Search Report for Application No. EP15275077.4, dated Sep. 4, 2015, 8 pages.
Fairbrother et al., "A Two-Level Graph Partitioning Problem Arising in Mobile Wireless Communications"; arXiv: 1705.08773v1 [math.OC] May 24, 2017; 23 pages.
GB Search Report for Application No. 1517069.9, dated Mar. 7, 2016, 4 pages.
GB Combined Search and Examination Report for Application No. 1517069.9, dated Jan. 31, 2018, 3 pages.
GB Combined Search and Examination Report for GB Application No. GB1603748.3, dated Aug. 26, 2016, 6 pages.
GB Search and Examination Report for GB Application No. GB 1710989.3, dated Dec. 1, 2017, 5 pages.
Ghaddar et al., "A Branch-And-Cut Algorithm Based On Semidefinite Programming For The Minimum K-Partition Problem," Ann Oper Res DOI 10 1007/s10479-008-0481-4, Springer Science+Business Media, LLC 2008, Published online Dec. 3, 2008, 20 pages.
Intention to Grant for GB Application No. 1713815.7, dated Jan. 14, 2019, 2 pages.
Intention to Grant for GB Application No. 1713816.5, dated Jan. 14, 2019, 2 pages.
International Preliminary Report on Patentability for Application No. PCT/EP2015/076524, dated Mar. 7, 2017, 12 pages.
International Preliminary Report on Patentability for Application No. PCT/EP2016/053286, dated Feb. 6, 2017, 14 pages.
International Preliminary Report on Patentability for Application No. PCT/EP2016/069745, dated Oct. 20, 2017, 13 pages.
International Preliminary Report on Patentability for Application No. PCT/EP2017/052738, dated Jun. 22, 2018, 27 pages.
International Preliminary Report on Patentability for Application No. PCT/EP2017/071645, dated Apr. 11, 2019, 14 pages.
International Preliminary Report on Patentability for Application No. PCT/EP2017/071646, dated Apr. 11, 2019, 8 pages.
International Preliminary Report on Patentability for Application No. PCT/EP2017/071649, dated Apr. 11, 2019, 8 pages.
International Preliminary Report on Patentability for PCT Application No. PCT/EP2017/053957, dated Sep. 4, 2018, 6 pages.
International Search Report and Written Opinion for Application No. PCT/EP2015/076524, dated Dec. 21, 2015, 11 pages.
International Search Report and Written Opinion for Application No. PCT/EP2016/053286, dated Apr. 11, 2016, 11 pages.
International Search Report and Written Opinion for Application No. PCT/EP2016/069745, dated Nov. 11, 2016, 11 pages.
International Search Report and Written Opinion for Application No. PCT/EP2017/071645, dated Nov. 27, 2017, 21 pages.
International Search Report and Written Opinion for Application No. PCT/EP2017/071646, dated Oct. 18, 2017, 12 pages.
International Search Report and Written Opinion for Application No. PCT/EP2017/071649, dated Oct. 12, 2017, 9 pages.
International Search Report and Written Opinion for PCT Application No. PCT/EP2017/052738, dated Mar. 27, 2017, 20 pages.
International Search Report and Written Opinion for PCT Application No. PCT/EP2017/053957, dated May 23, 2017, 11 pages.
Invitation to pay additional fees and, where applicable, protest fee for PCT Application No. PCT/EP2017/071645, dated Oct. 9, 2017, 17 pages.
MacQueen J., "Some Methods For Classification And Analysis Of Multivariate Observations," Fifth Berkeley Symposium, University of California, Los Angeles, 1967, pp. 281-297.
Motorola, et al., "Draft CR capturing HeNB inbound mobility agreements," 3GPP Draft, R2-096401 CR HENB 36_300 Agreements_V7, 3rd Generation Partnership Project (3GPP), Jeju, Korea, XP050391033, Nov. 9, 2009, 4 pages.
Mukhopadhyay et al., "Novel RSSI Evaluation Models For Accurate Indoor Localization With Sensor Networks," 978-1-4799-2361-8/14, Bharti School of Telecommunication Technology and Management IIT Delhi Hauz Khas, New Delhi, 2014 IEEE, 6 pages.
NGMN the engine of broadband wireless innovation "Recommended Practices for multi-vendor SON deployment," Deliverable D2 Version 1.0 by NGMN Alliance, Reading Bridge House George Street Reading Berkshire RG 1 8LS UK, Jan. 28, 2014, 30 pages.
Ning L., et al., "Fuzzy Layered Physical Cell Identities Assignment in Heterogeneous and Small Cell Networks," Electronics Letters May 12, 2016, vol. 52 No. 10, pp. 879-881.
Qualcomm Technologies, Inc. "LTE Small Cell SON Test Cases, Functionality and Interworking", San Diego, CA, USA, Jun. 5, 2015, 82 pages.
Qualcomm Europe, "QoS principles for CSG members and non-members at hybrid access mode HeNBs," 3GPP Draft, R3-091022, 3rd Generation Partnership Project (3GPP), San Francisco, US, XP050341407, May 4-8, 2009, 4 pages.
Qualcomm Europe, "QoS support for hybrid CSG cells," 3GPP Draft, R3-091454, 3rd Generation Partnership Project (3GPP), San Francisco, US, XP050341776, May 4, 2009, 3 pages.

(56) References Cited

OTHER PUBLICATIONS

Rendl F., "Semidefinite Relaxations For Partitioning, Assignment And Ordering Problems," Cross Mark, Ann Oper Res (2016) 240 119-140 DOI 10 1007/s10479-015-2015-1, Published online Sep. 15, 2015, Springer Science+Business Media New York 2015, 22 pages.
Small Cell Forum Release 9.0, Document 176.09.01 LTE small cell SON test cases, Functionality and interworking, version 176.09.01, Feb. 21, 2017, 95 pages.
UK Combined Search and Examination Report for GB Patent Application No. GB1604515.5, dated Sep. 9, 2016, 3 pages.
UK Examination Report for GB Patent Application No. GB1604515.5, dated May 11, 2017, 1 pages.
UK Examination Report for GB Patent Application No. GB1604515.5, dated Jan. 31, 2018, 3 pages.
UK Intention to Grant for GB Patent Application No. GB1604515.5, dated May 11, 2018, 2 pages.
Web article, "DSDP," NEOS Interfaces to DSDP, http://www.mcs.anl.gov/DSDP, retrieved Jul. 3, 2017, 4 pages.
Web article, "Welcome to CVXPY," Welcome to CVXPY—CVXPY 0.4.9 documentation, http://www.cvxpy.org/en/latest, retrieved Jul. 3, 2017, 1 page.
Wu et al., "Physical Cell Identity Self-Organization for Home eNodeB Deployment in LTE"; Nokia Siemens Networks, 978-1-4244-3709-2/10, Beijing China, 2010 IEEE, 6 pages.
Younis., et al., "Military Communications; Cognitive MANET Design For Mission-Critical Networks," IEEE Communications Magazine, 0163-6804/09 2009 IEEE, Oct. 2009, 5 pages.
International Search Report and Written Opinion, International Application No. PCT/EP2018/066116, dated Aug. 29, 2018, 11 pages.
Combined Search and Examination Report, GB Application No. GB1711529.6, dated Dec. 13, 2017, 7 pages.
European Search Report, European Application No. EP17181876.8, dated Jan. 8, 2018, 11 pages.
3GPP, "Issues on X2-GW deployment"; $3^{RD}$ Generation Partnership Project (3GPP); 3GPP TSG-RAN3 Meeting #79bis, R3-130571; XP050700448, XTE; Mar. 4, 2013, 6 pages.
3rd Generation Partnership Project, Technical Specification Group Radio Access Network; Evolved Universal Terrestrial Radio Access (E-UTRA) and Evolved Universal Terrestrial Radio Access Network (E-UTRAN), Overall description; Stage 2, Release 14, 3GPP TS 36.300 V14.2.0, Mar. 2017, 330 pages.
3rd Generation Partnership Project, Technical Specification Group Radio Access Network; Evolved Universal Terrestrial Radio Access (E-UTRA) and Evolved Universal Terrestrial Radio Access Network (E-UTRAN), X2 application protocol (X2AP), Release 14, 3GPP TS 36.423 V14.2.0, Mar. 2017, 242 pages.
Nokia Siemens Networks: "X2 interface proxy at DeNB," 3GPP Draft; R3-101662 X2_Proxy_Relay, $3^{rd}$ Generation Partnership Project (3GPP), Mobile Competence Centre; 650, Route De Lucioles; F-06921 Sophia-Antipolis Cedex; France, vol. RAN WG3, No. Montreal, Canada; May 10, 2010, May 1, 2010 (May 1, 2010), XP050425399, Section 4, 5; p. 4; figure 2.
Huawei: 11 Report of email discussion [97bis#19][LTE/FeD2D]—Group handover, 3GPP Draft; R2-1705300 Report of Email Discussion 97BIS#19—FED2D Group Handover, 3rd Generation Partnership Project (3GPP), Mobile Competence Centre ; 650, Route Des Lucioles ; F-06921 Sophia-Antipol vol. RAN WG2, No. Hangzhou, China; May 15, 2017-May 19, 2017; May 14, 2017 (May 14, 2017), XP051275745, 11 Pages.
New Postcom: "X2 connection and routing for X2-GW deployment", 3GPP Draft; R3-130225 X2 Connection And Routing For X2-GW Deployment, $3^{rd}$ Generation Partnership Project (3GPP), Mobile Competence Centre ; 650, Route Des Lucioles F-06921 Sophia-Antipolis Cedex, vol. RAN WG3, No. St. Julian; Jan. 28, 2013-Feb. 1, 2013, Jan. 19, 2013 (Jan. 19, 2013). XP050671040, 3 pages.
Communication pursuant to Article 94(3) EPC for Application No. 18733557.5 dated Dec. 14, 2021, 12 pages.

\* cited by examiner

CELLULAR TELECOMMUNICATIONS NETWORK

CROSS-REFERENCE TO RELATED APPLICATIONS

The present application is a National Phase entry of PCT Application No. PCT/EP2018/066116, filed Jun. 18, 2018, which claims priority from European Patent Application No. 17181876.8 filed Jul. 18, 2017, each of which is fully incorporated herein by reference.

TECHNICAL FIELD

The present disclosure relates to a cellular telecommunications network.

BACKGROUND

A cellular telecommunications network includes a plurality of base stations which each provide telephony and data services to a plurality of User Equipment (UE) within a coverage area. Traditional base stations typically had coverage areas of several square kilometers, but the capacity was shared amongst all UEs. To increase this capacity, "home" base stations were introduced (which are sometimes called femto base stations, pico base stations, micro base stations or metro base stations depending on their coverage area), and the traditional base stations are now often referred to as "macro" base stations. These home base stations had much smaller coverage areas than their macro base station counterparts but increased the overall capacity of the network.

Cellular networks have also introduced inter-base station messages (such as the X2 message in the Long Term Evolution (LTE) protocol) to allow inter base station communication. These messages are typically used to communicate their operating parameters (e.g. their Physical Cell Identifier (PCI)), load management information, and to coordinate a handover of a UE to a target base station. A "handover" is the transfer of a UE from its serving base station to the target base station with minimal disruption when it is determined that the target base station should thereafter provide telephony and data services to that UE.

In order to support inter-base station messaging, each base station must store information regarding other base stations in the network. This information typically includes an identifier for the other base station, such as the enhanced Cell Global Identifier (eCGI), and an IP address of the other base station. Each base station must also set up and maintain a connection with every other base station. These requirements were acceptable in cellular networks with a relatively small number of macro base stations. However, as the number of base stations has increased with the introduction of home base stations, these requirements have become a burden and it is increasing difficult for base stations (especially macro base stations with many neighboring home base stations) to update their stored information and maintain the inter base station connections.

In the LTE protocol, this problem was addressed by the introduction of a network element that inter-connects neighboring base stations such that inter base station messages may be communicated indirectly via the network element. This is known as an X2 Gateway (X2 GW), although other network elements such as the X2 Broker may also serve the same purpose. The X2 GW is used to transfer X2 Application Protocol (X2 AP) messages between a source and target base station by encapsulating it within an X2 AP Message Transfer message. The X2 AP Message Transfer message includes a Radio Network Layer (RNL) header which identifies both the source and target base station, and a payload including the encapsulated X2 AP message. On receipt of an X2 AP Message Transfer message from the source base station, the X2 GW decodes the RNL header to identify the target base station, and forwards the X2 AP Message Transfer message to the identified target base station. This is a more scalable solution as the source base station only needs to establish and maintain a single connection with the X2 GW for a plurality of target base stations (rather than a connection with each of the plurality of target base stations).

SUMMARY

According to a first aspect of the disclosure, there is provided a method of sending an X2 message between a first base station and a plurality of recipient base stations in a cellular telecommunications network, wherein the X2 message is transmitted via an X2 Gateway (X2GW) the method comprising: the X2GW receiving a first X2 message from a first base station, wherein the first X2 message includes: a first address portion identifying a second and third recipient base station, and a first content portion; the X2GW transmitting a second X2 message to the second recipient base station, the second X2 message including: a second address portion identifying the second recipient base station, and a second content portion; and the X2GW transmitting a third X2 message to the third recipient base station, the third X2 message including: a third address portion identifying the third recipient base station, and a third content portion, wherein the second and third content portions include the first content portion.

Embodiments of the present disclosure provide the advantage that the number of inter-base station messages having the same content that must be sent from the source base station to a relay component for onward transmission to N target base stations is reduced from N to 1. This is particularly advantageous in scenarios where the source base station must update all of its neighboring base stations upon a change in configuration (such as a change in its transmission frame or scheduling pattern).

According to a second aspect of the disclosure, there is provided an X2 Gateway (X2GW) for relaying an X2 message between a first base station and a plurality of recipient base stations in a cellular telecommunications network, the X2GW comprising: a transceiver configured to receive a first X2 message from a first base station, wherein the first X2 message includes: a first address portion identifying a second and third recipient base station, and a first content portion; a processor configured to: prepare a second X2 station message for the second recipient base station, the second X2 message including: a second address portion identifying the second recipient base station, and a second content portion; and prepare a third X2 message for the third recipient base station, the third X2 message including: a third address portion identifying the third recipient base station, and a third content portion, wherein the second and third content portions include the first content portion, wherein the transceiver is further configured to transmit the second X2 message to the second recipient base station and to transmit the third X2 message to the third recipient base station.

According to a third aspect of the disclosure, there is provided a method of sending an X2 message from a first base station to a plurality of recipient base stations in a cellular telecommunications network via an X2 Gateway (X2GW) the method comprising: a first base station preparing a first X2 message having a first content portion; the first base station determining that the first X2 message is destined for a second and third recipient base station; the first base station determining that the first X2 message is to be sent to the second and third recipient base stations via an X2GW; the first base station preparing a first address portion of the first X2 message, wherein the first address portion identifies both the second and third recipient base station; and the first base station transmitting the first X2 message to the X2GW.

According to a fourth aspect of the disclosure, there is provided a first base station for a cellular telecommunications network, the cellular telecommunications network further including a plurality of recipient base stations and an X2 Gateway (X2GW) the first base station comprising a processor configured to: determine that a first X2 message, having a first content portion, is destined for a second and third recipient base station, determine that the first X2 message is to be sent to the second and third recipient base stations via an X2GW, and to prepare a first address portion for the first X2 message, wherein the first address portion identifies both the second and third recipient base stations; and a transmitter configured to send the first X2 message to the X2GW.

According to a fifth aspect of the disclosure, there is provided a computer program comprising instructions which, when the program is executed by a computer, cause the computer to carry out the first or third aspects of the present disclosure. The computer program may be provided on a computer readable carrier medium.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
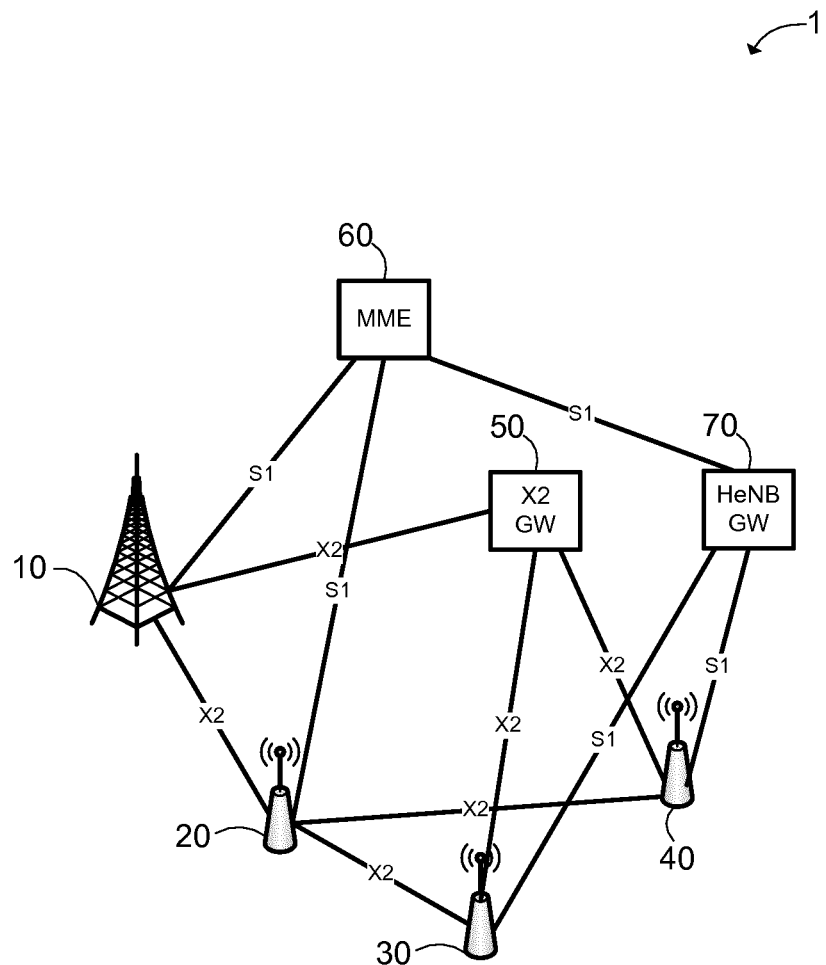
FIG. 1 is a schematic diagram of an embodiment of a cellular telecommunications network of the present disclosure.

A first embodiment of a cellular telecommunications network 1 will now be described with reference to FIGS. 1 to 3. FIG. 1 illustrates a macro base station ("MeNB") 10 and a first, second and third home base station ("HeNB") 20, 30, 40. These base stations each serve a plurality of User Equipment (UE), not shown for simplicity, about their respective coverage areas. In this embodiment, the base stations 10, 20, 30, 40 communicate using the Long Term Evolution (LTE) protocol.

FIG. 1 also shows an X2 Gateway ("X2 GW") 50, a Mobility Management Entity (MME) 60 and a HeNB Gateway ("HeNB GW") 70. The form of each respective connection between each entity is also illustrated in FIG. 1.

Figure 2:
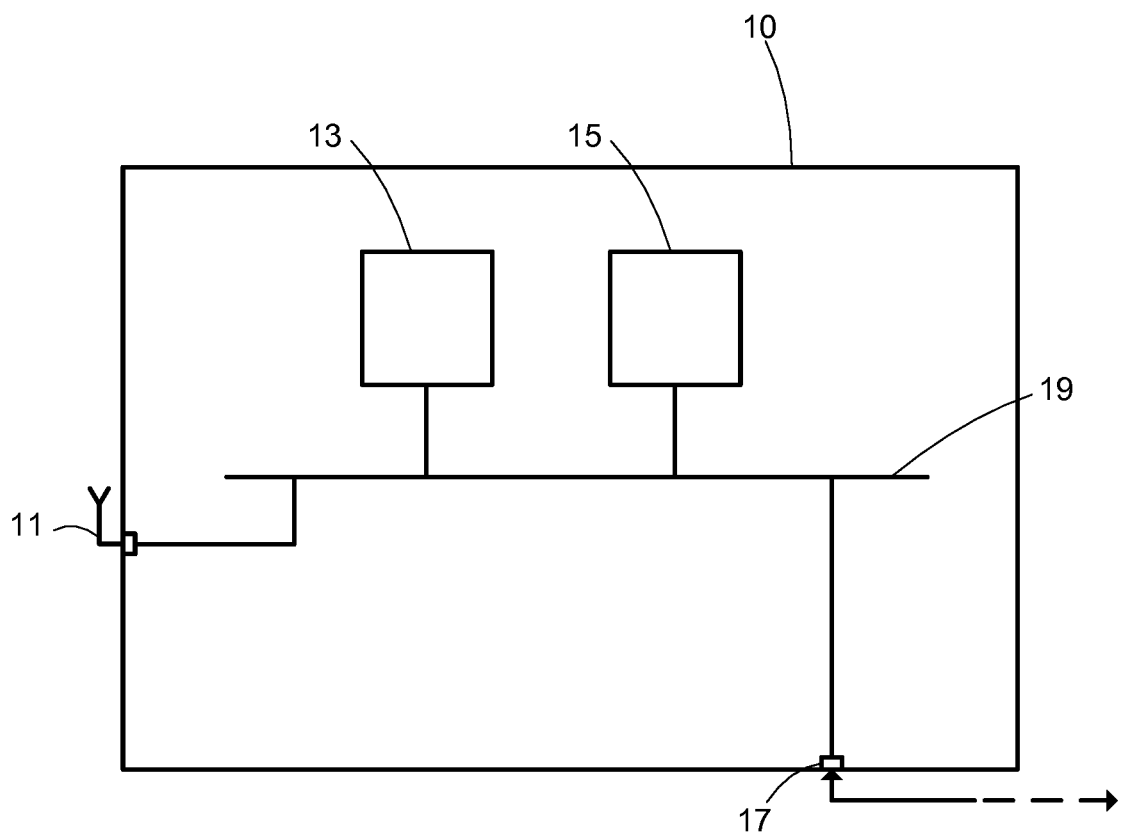
FIG. 2 is a schematic diagram of a base station of the network of FIG. 1.

The MeNB 10 is shown in more detail in the schematic diagram of FIG. 2. The MeNB 10 includes a first transceiver 11, a processor 13, memory 15 and a second transceiver 17, all connected via bus 19. In this embodiment, the first transceiver 11 is an antenna configured for transmissions according to the LTE protocol, and the second transceiver 17 is a wired optical fiber connection (typically known as a backhaul) with one or more cellular core networking nodes, including the X2 GW 50 and the MME 60. Memory 15 is configured to store an X2 connection table which includes information regarding each established X2 connection with other base stations. In this embodiment, the X2 connection table includes an identifier for the neighboring base station of each established X2 connection, and an IP address to use when sending an X2 message to that neighboring base station. This X2 connection table will be discussed in more detail in the description of the embodiment of the method of the present disclosure.

The first, second and third HeNBs 20, 30, 40 are of similar form to the MeNB 10, but its components differ slightly such that they are more suited for transmissions about smaller coverage areas (typically covering a user's premises). Furthermore, in this embodiment, the second transceivers of both the second and third HeNBs 30, 40 are also connected to the X2 GW 50 and the HeNB GW 70 (with an onward connection from the HeNB GW 70 to the MME 60), but the second transceiver of the first HeNB 20 is not connected to either the X2 GW 50 or HeNB GW 70 (and has a direct connection to the MME 60).

The MeNB 10, and second and third HeNBs 30, 40 are also configured to store, in memory, an IP address for the X2 GW 50. In this embodiment, the MeNB 10 and second and third HeNB 30, 40 are pre-configured with this information (but they may also be updated with new data upon receipt of a new configuration file via their second transceivers).

Figure 3:
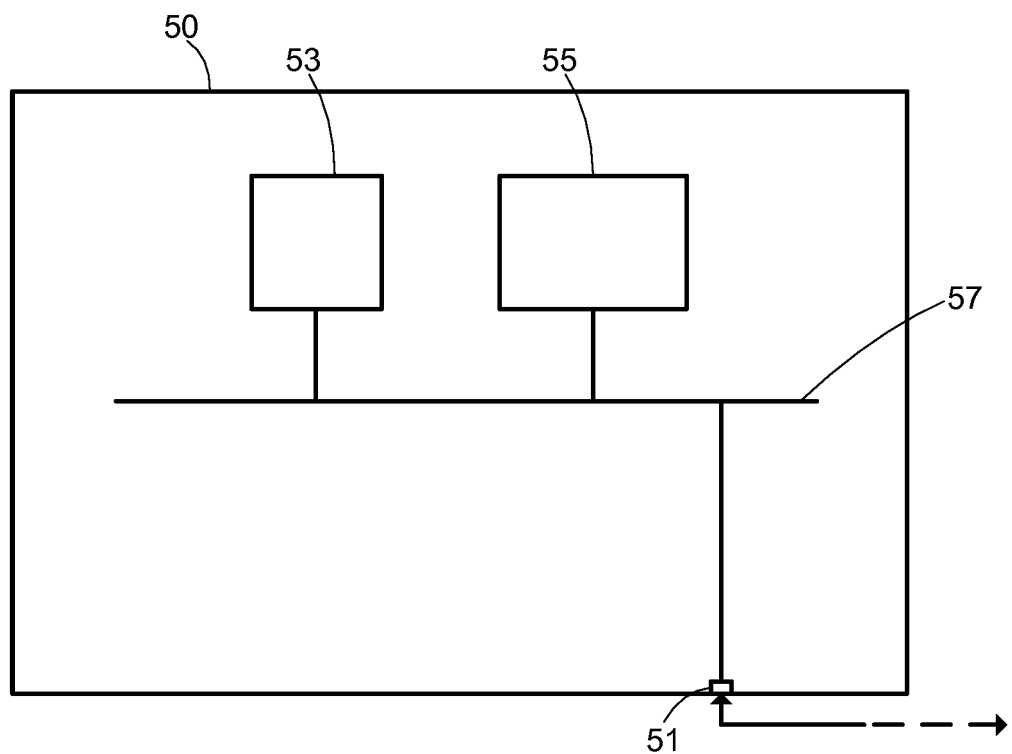
FIG. 3 is a schematic diagram of an X2 Gateway of the network of FIG. 1.

The X2 GW 50 is shown in more detail in the schematic diagram of FIG. 3. The X2 GW 10 includes a first transceiver 51, a processor 53 and memory 55, all connected via bus 57. In this embodiment, the first transceiver 51 is a wired optical fiber connection with the MeNB 10 and the second and third HeNBs 30, 40. Memory 55 stores an eNB association table which stores connection information for all base stations that have registered with that X2 GW 50, including their enhanced Cell Global Identifier (eCGI) and Transport Network Layer (TNL) address.

Figure 4:
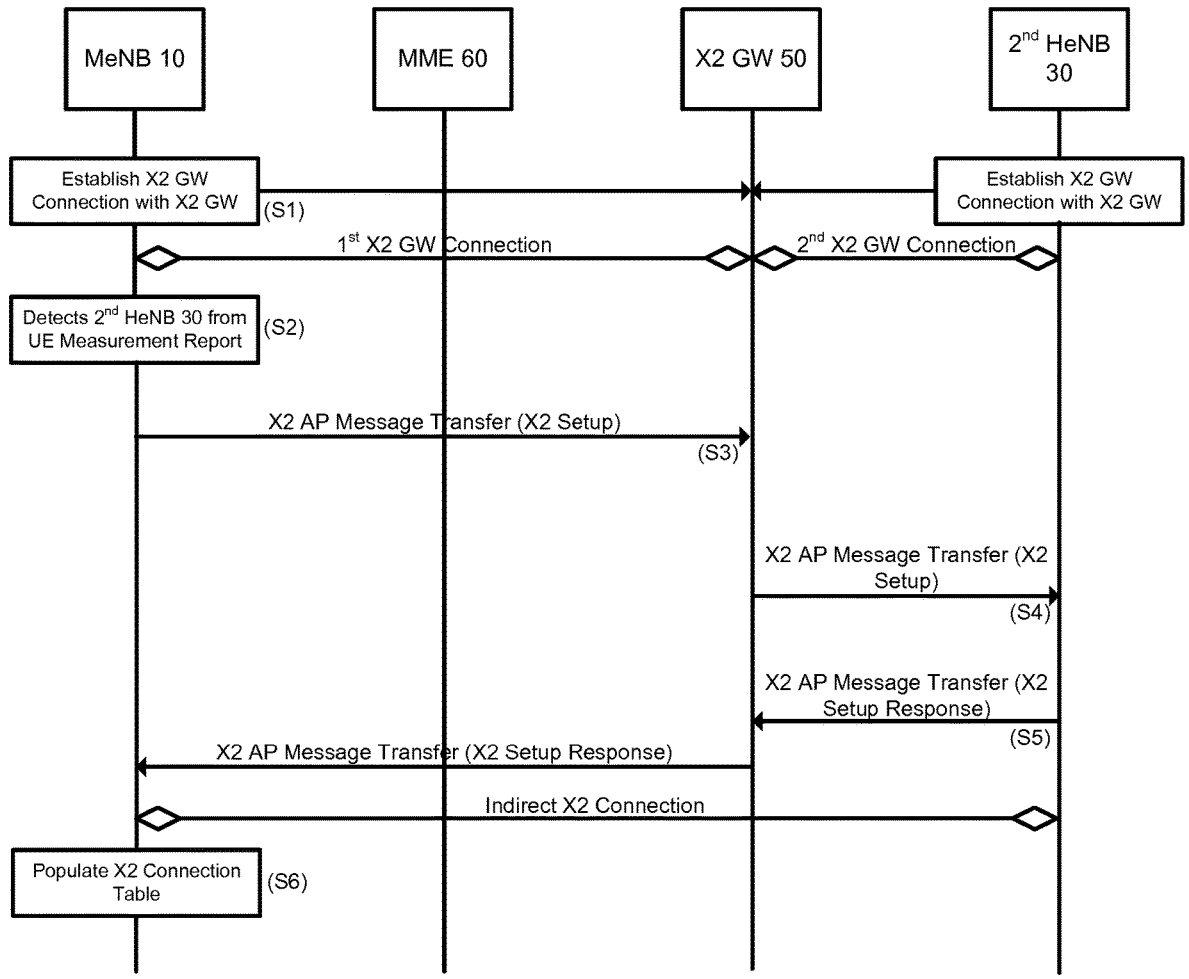
FIG. 4 is a call flow diagram of an embodiment of a method of the present disclosure.
Figure 5:
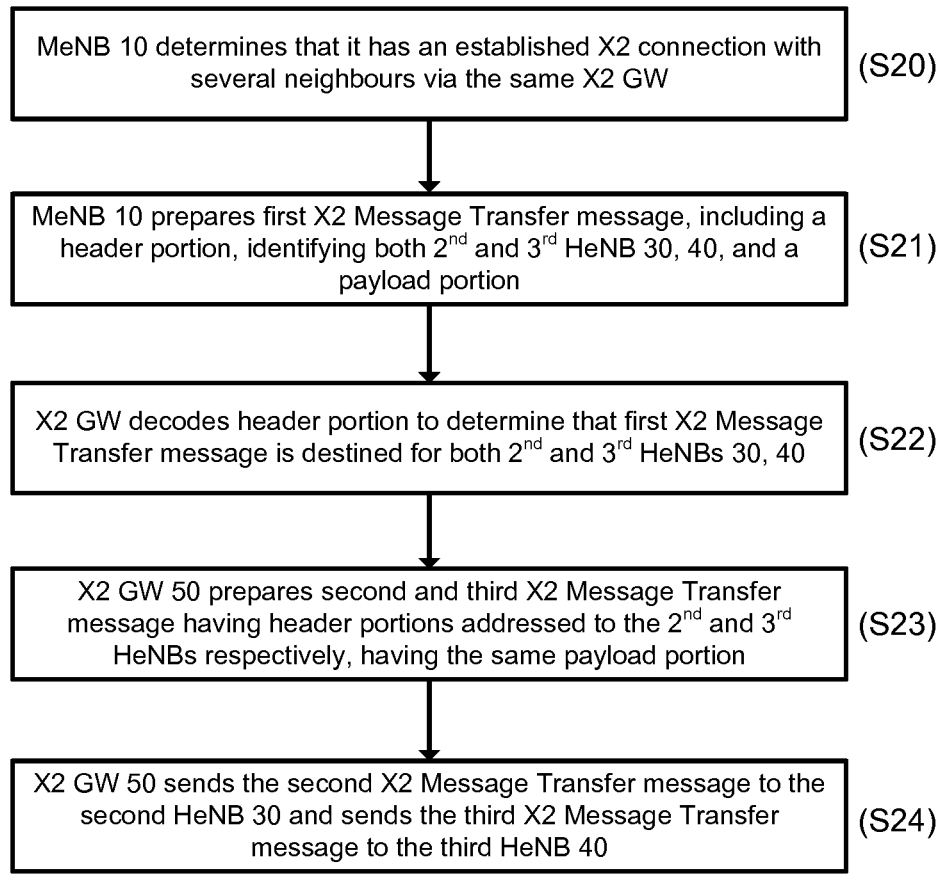
FIG. 5 is a flow diagram of a method of sending an inter-base station message to a plurality of base stations of the embodiment of FIG. 4.

An embodiment of a method of the present disclosure will now be described with reference to FIGS. 4 and 5. FIG. 4 illustrates an embodiment of a method of establishing an indirect X2 connection between the MeNB 10 and the second HeNB 30 via the X2 GW 50.

In S1, the MeNB 10 establishes an X2 connection with the X2 GW (hereinafter, an "X2 GW connection"). This is typically performed when a base station is initialized for the first time or following a reboot. To establish this X2 GW connection, the MeNB 10 sends a registration X2 AP Message Transfer message to the X2 GW 50 (explained in more detail below). Before this message can be sent, the MeNB 10 establishes a Stream Control Transmission Protocol (SCTP) association with the X2 GW 50. The MeNB 10 initiates the SCTP association using the X2 GW's IP address (known from pre-configuration), and the MeNB 10 and X2 GW 50 exchange TNL addresses (in this embodiment, their IP addresses). Once the SCTP association has been established, the MeNB 10 sends the registration X2 AP Message Transfer message to the X2 GW 50. The registration X2 AP Message Transfer includes an RNL header having the MeNB's eCGI as the source eNB Information Element (IE), but the target eNB IE and payload portions of the message are void. The X2 GW 50 is configured to interpret the registration X2 AP Message Transfer message having void target eNB IE and payload portions as a registration message, and responds by registering the MeNB 10 in memory 55. Accordingly, the X2 GW 50 updates its eNB association table in memory to indicate that the MeNB 10 is a registered base station, and to identify both its eCGI and TNL (i.e. IP) address. Following step S1, the MeNB 10 has a 1$^{st}$ X2 GW connection with the X2 GW 50.

The second HeNB 30 also establishes an X2 GW connection with the X2 GW 50 (the 2$^{nd}$ X2 GW connection in FIG. 4) in the same manner. The skilled person will understand that it is unlikely for these registrations to be contemporaneous, but they are performed by both the MeNB 10 and second HeNB 30 at some point in time before the remaining steps of this embodiment of the invention. Once registered with the X2 GW 50, both the MeNB 10 and second HeNB 30 begin normal base station operation providing telephony and data services to one or more UEs.

In S2, the MeNB 10 receives a measurement report from a UE which identifies the second HeNB 30 by its eCGI. The MeNB 10 has no stored data regarding the second HeNB 30 and receipt of this measurement report therefore constitutes a detection of a new neighbor base station. In response, in S3, the MeNB 10 sends an X2 AP Message Transfer message to the X2 GW 50, in which the source eNB IE is the MeNB 10 eCGI, the target eNB IE is the second HeNB's eCGI, and the payload portion is an X2 Setup message.

On receipt of this message, in S4, the X2 GW 50 determines that the message is destined for the second HeNB 30 (from the target eNB IE), looks up the second HeNB's IP address from memory 55, and forwards the X2 AP Message Transfer message to the second HeNB 30.

In S5, the second HeNB 30 responds to the X2 Setup message with an X2 Setup Response message. Again, this is encapsulated into an X2 AP Message Transfer message (with the source eNB IE and target eNB IE being the second HeNB's eCGI and MeNB's eCGI respectively), which is sent via the X2 GW to the MeNB 10. Following this message exchange, the MeNB 10 and second HeNB 30 have an established (indirect) X2 connection, which is via both the 1$^{st}$ X2 GW connection (between the MeNB 10 and the X2 GW 50) and the 2$^{nd}$ X2 GW connection (between the X2 GW 50 and the second HeNB 30).

In S6, the MeNB 10 populates its X2 connection table with a new entry identifying the second HeNB and an IP address for the X2 GW 50.

The above method is initiated each time the MeNB 10 detects a new neighboring base station (e.g. the first and third HeNBs 20, 40). As the first HeNB 10 is not associated with the X2 GW 50, a direct X2 connection is established and the X2 connection table identifies the first HeNB 10 and the first HeNB's IP address. As the third HeNB 40 is associated with the X2 GW 50, an indirect X2 connection is established (which in part uses the same X2 GW connection between the MeNB 10 and X2 GW 50) and the X2 connection table identifies the third HeNB 40 and the X2 GW's IP address. This is illustrated in the following table:

TABLE 1

Table illustrating data stored in MeNB's X2 connection table

| Neighboring Base Station Identifier | IP Address for X2 Messages |
| --- | --- |
| eCGI of first HeNB 20 | IP address of first HeNB 20 |
| eCGI of second HeNB 30 | IP address of X2 GW 50 |
| eCGI of third HeNB 40 | IP address of X2 GW 50 |

Once the indirect X2 connections have been established, then X2 messages may be transmitted to the second and third HeNBs 30, 40 via the X2 GW 50. This will now be described with reference to FIG. 5, which illustrates an overview of the MeNB 10 sending an X2 Application Protocol ("X2 AP") message to all neighboring base stations with an established X2 connection. In this example, the X2 AP message indicates the Time Division Duplex (TDD) pattern that is being used by the MeNB 10.

In S20, the MeNB 10 determines whether it has an established X2 connection with a plurality of neighboring base stations via the same X2 GW. In this example, the MeNB 10 has indirect X2 connections with both the second and third HeNBs 30, 40 via the X2 GW 50 (which involves the same X2 GW connection between the MeNB 10 and the X2 GW 50). The following embodiment describes the transmission of the X2 AP message to both the second and third HenBs 30, 40.

In S21, the MeNB 10 prepares a first X2 AP Message Transfer message for both the second and third HeNBs 30, 40. This first message includes an RNL header, which includes the MeNB 10 in the source eNB Information Element (IE) and both the second and third HeNBs 30, 40 in the target eNB IE, and a payload portion including the X2 AP message. The MeNB 10 sends the first X2 AP Message Transfer message to the X2 GW 50.

In S22, the X2 GW 50 receives the first X2 AP Message Transfer message and decodes the RNL header. The X2 GW 50 therefore determines that the message is addressed to both the second and third HeNBs 30, 40. In S23, the X2 GW 50 prepares a second X2 AP Message Transfer message, which includes an RNL header identifying the second HeNB 30 only and a payload portion including the X2 AP message, and prepares a third X2 AP Message Transfer message, which includes an RNL header identifying the third HeNB 40 only and a payload portion including the X2 AP message.

In step S24, the X2 GW 50 sends the second X2 AP Message Transfer message to the second HeNB 30 and sends the third X2 AP Message Transfer message to the third HeNB 40.

The present disclosure is therefore advantageous in that the number of X2 AP Message Transfer messages that must be sent to an X2 Gateway for onward transmission to N base stations is reduced from N to 1. In the above example in which the MeNB 10 supports dynamic TDD and is sending its TDD pattern to all of its neighbors, the processing involved in the MeNB 10 to prepare all of these messages and the processing involved in the X2 GW 50 for forwarding all of these messages is significantly reduced. This method is also advantageous in any other situation in which the content of the X2 AP message is the same for many neighboring base stations, such as when a source base station sends an X2 AP message identifying its Almost Blank Subframes (ABS) to its neighbors for enhanced Inter-Cell Interference (eICIC) mitigation.

The above embodiments set out the disclosure in terms of the LTE protocol. However, the skilled person will understand that the present disclosure may be applied to any cellular network of any protocol which includes an intermediate node between base stations, and the X2 Gateway is just one example.

In the above embodiment, the target eNB IE of the X2 AP Message Transfer message is expanded to include a plurality of target eNBs, rather than just a single target eNB as in the prior art. This expansion may be performed in the same manner as for the "Served Cell" IE in the X2 Setup Request message (of 3GPP TS36.423, section 9.1.2.3)

The skilled person will understand that any combination of features is permissible within the scope of the invention, as claimed.

The invention claimed is:

1. A method of sending an X2 message between a first base station and a plurality of recipient base stations in a cellular telecommunications network, wherein the X2 message is transmitted via an X2 Gateway (X2GW) the method comprising:
the X2GW receiving a first X2 message from a first base station, wherein the first X2 message includes:
a first address portion including an identifier for a second recipient base station and an identifier for a third recipient base station, the identifier for the second recipient base station and the identifier for the third recipient base station being distinct, and
a first content portion including at least one of a transmission frame pattern or a scheduling pattern of the first base station;
the X2GW transmitting a second X2 message to the second recipient base station, the second X2 message including:
a second address portion identifying the second recipient base station, and
a second content portion; and
the X2GW transmitting a third X2 message to the third recipient base station, the third X2 message including:
a third address portion identifying the third recipient base station, and
a third content portion,
wherein the second content portion and the third content portion include the first content portion.

2. A non-transitory computer-readable storage medium storing a computer program comprising instructions which, when the computer program is executed by a computer, cause the computer to carry out the method of claim 1.

3. An X2 Gateway (X2GW) for relaying an X2 message between a first base station and a plurality of recipient base stations in a cellular telecommunications network, the X2GW comprising:
a transceiver configured to receive a first X2 message from the first base station, wherein the first X2 message includes:
a first address portion including an identifier for a second recipient base station and an identifier for a third recipient base station, the identifier for the second recipient base station and the identifier for the third recipient base station being distinct, and
a first content portion including at least one of a transmission frame pattern or a scheduling pattern of the first base station; and a processor configured to:
prepare a second X2 message for the second recipient base station, the second X2 message including:
a second address portion identifying the second recipient base station, and
a second content portion; and
prepare a third X2 message for the third recipient base station, the third X2 message including:
a third address portion identifying the third recipient base station, and
a third content portion,
wherein the second content portion and the third content portion include the first content portion, and
wherein the transceiver is further configured to transmit the second X2 message to the second recipient base station and to transmit the third X2 message to the third recipient base station.

4. A method of sending an X2 message from a first base station to a plurality of recipient base stations in a cellular telecommunications network via an X2 Gateway (X2GW) the method comprising:
the first base station preparing a first X2 message having a first content portion including at least one of a transmission frame pattern or a scheduling pattern of the first base station;
the first base station determining that the first X2 message is destined for a second recipient base station and a third recipient base station;
the first base station determining that the first X2 message is to be sent to the second recipient base station and the third recipient base stations via an X2GW;
the first base station preparing a first address portion of the first X2 message, wherein the first address portion includes an identifier for the second recipient base station and an identifier for the third recipient base station, the identifier for the second recipient base station and the identifier for the third recipient base station being distinct; and
the first base station transmitting the first X2 message to the X2GW.

5. A first base station for a cellular telecommunications network, the cellular telecommunications network further including a plurality of recipient base stations and an X2 Gateway (X2GW) the first base station comprising:
a processor configured to:
determine that a first X2 message, having a first content portion including at least one of a transmission frame pattern or a scheduling pattern of the first base station, is destined for a second recipient base station and a third recipient base station,
determine that the first X2 message is to be sent to the second recipient base station and the third recipient base station via an X2GW, and
prepare a first address portion for the first X2 message, wherein the first address portion includes an identifier for the second recipient base station and an identifier for the third recipient base station, the identifier for the second recipient base station and the identifier for the third recipient base station being; and
a transmitter configured to send the first X2 message to the X2GW.

* * * * *

UNITED STATES PATENT AND TRADEMARK OFFICE
CERTIFICATE OF CORRECTION

| | | |
|---|---|---|
| PATENT NO. | : 11,558,854 B2 | Page 1 of 1 |
| APPLICATION NO. | : 16/630296 | |
| DATED | : January 17, 2023 | |
| INVENTOR(S) | : Salvador Diaz Sendra | |

It is certified that error appears in the above-identified patent and that said Letters Patent is hereby corrected as shown below:

In the Specification

In Column 6, Line 27, delete "HenBs" and insert -- HeNBs --.
In Column 7, Line 10, after "9.1.2.3)" insert -- . --.

In the Claims

In Column 8, Line 57, in Claim 5, delete "being;" and insert -- being distinct; --.

Signed and Sealed this
Twentieth Day of June, 2023

Katherine Kelly Vidal
*Director of the United States Patent and Trademark Office*